United States Patent
Kuratani et al.

(10) Patent No.: US 11,121,798 B2
(45) Date of Patent: Sep. 14, 2021

(54) CONTROL METHOD FOR COMMUNICATION DEVICE, AND COMMUNICATION DEVICE

(71) Applicant: Murata Machinery, Ltd., Kyoto (JP)

(72) Inventors: Yasuhiro Kuratani, Inuyama (JP); Ryuji Shimoji, Kyoto (JP); Keita Yagi, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 7 days.

(21) Appl. No.: 16/765,355

(22) PCT Filed: Oct. 22, 2018

(86) PCT No.: PCT/JP2018/039224
§ 371 (c)(1),
(2) Date: May 19, 2020

(87) PCT Pub. No.: WO2019/097957
PCT Pub. Date: May 23, 2019

(65) Prior Publication Data
US 2020/0358551 A1    Nov. 12, 2020

(30) Foreign Application Priority Data
Nov. 20, 2017    (JP) .............................. JP2017-222970

(51) Int. Cl.
*H04L 1/00*     (2006.01)
*H04W 28/18*    (2009.01)
(Continued)

(52) U.S. Cl.
CPC .......... *H04L 1/0003* (2013.01); *H04L 1/0026* (2013.01); *H04W 28/18* (2013.01);
(Continued)

(58) Field of Classification Search
CPC .... H04L 1/0003; H04L 1/0026; H04W 28/18; H04W 72/1205; H04W 84/12; H04W 88/08
See application file for complete search history.

(56) References Cited

U.S. PATENT DOCUMENTS

2004/0081260 A1* 4/2004 Matsusaka ............ H04L 1/0003
                                                            375/340
2007/0190947 A1* 8/2007 Sakai .................... H04L 5/1438
                                                            455/67.14
(Continued)

FOREIGN PATENT DOCUMENTS

JP    2001-309445 A    11/2001
JP    2003-115893 A    4/2003
(Continued)

OTHER PUBLICATIONS

Notice of Reasons for Rejection dated Mar. 23, 2021, of counterpart Japanese Application No. 2019-553767, along with an English Translation.

*Primary Examiner* — Chi H Pham
*Assistant Examiner* — Weibin Huang
(74) *Attorney, Agent, or Firm* — DLA Piper LLP (US)

(57) ABSTRACT

A method of controlling a communication device including a communication interface that communicates with a wireless terminal includes successively selecting one transmission scheme included in a plurality of transmission schemes according to schedule information and using the selected one transmission scheme for a trial of communications with the wireless terminal via a communication interface in a first period; determining which transmission scheme of the plurality of transmission schemes has succeeded in communicating with the wireless terminal in the first period; and adjusting the schedule information so that a trial of communications using a transmission scheme determined as
(Continued)

having succeeded in communicating with the wireless terminal is started earlier in a second period subsequent to the first period than in the first period.

9 Claims, 9 Drawing Sheets

(51) Int. Cl.
*H04W 72/12* (2009.01)
*H04W 84/12* (2009.01)
*H04W 88/08* (2009.01)

(52) U.S. Cl.
CPC ....... *H04W 72/1205* (2013.01); *H04W 84/12* (2013.01); *H04W 88/08* (2013.01)

(56) References Cited

U.S. PATENT DOCUMENTS

2014/0050151 A1\* 2/2014 Riddington ........... H04L 1/0026
370/328
2017/0078132 A1\* 3/2017 Huang .................. H04L 1/0002
2019/0386768 A1\* 12/2019 Shimoji ................ H04W 24/10

FOREIGN PATENT DOCUMENTS

| JP | 2005-72878 A | 3/2005 |
| JP | 2007-221385 A | 8/2007 |
| JP | 2015-119256 A | 6/2015 |
| JP | 6142124 B1 | 6/2017 |

\* cited by examiner

| Trial number | Transmission scheme |
|---|---|
| 1 | A |
| 2 | A |
| ... | ... |
| 37 | A |
| 38 | B |
| ... | ... |
| 55 | B |
| 56 | C |
| ... | ... |
| 60 | C |
| 61 | D |
| ... | ... |
| 64 | D |

| Trial number | Transmission scheme | Success/failure |
|---|---|---|
| 1 | A | NG |
| 2 | A | NG |
| ... | ... | ... |
| 37 | A | NG |
| 38 | B | NG |
| 39 | B | NG |
| 40 | B | OK |

CONTROL METHOD FOR COMMUNICATION DEVICE, AND COMMUNICATION DEVICE

TECHNICAL FIELD

This disclosure relates to a control method for a communication device, and a communication device.

BACKGROUND

Control systems that include devices (also referred to as "equipment") that perform processing on articles or on vehicles running on ceilings or floors are used within facilities such as factories. Equipment included in a control system receives control information about the equipment from a control unit in the control system and operates in accordance with the received control information.

Wireless communications may be used for transmission and reception of the control information. If the communications end in failure due to radio noise or other reasons, the control information is re-transmitted.

The control unit is required to successively communicate with a plurality of pieces of equipment within a limited period of time. Thus, communications with each piece of equipment, including retransmission, have to be completed within a predetermined period of time out of the limited period of time, and are also desired to be completed within a time as short as possible.

Japanese Unexamined Patent Application Publication No. 2003-115893 discloses a technique for choosing an optimum transmission rate, or more commonly a transmission scheme, with reference to communication environments in a communication system.

According to the technique disclosed in Japanese Unexamined Patent Application Publication No. 2003-115893, communications using a plurality of transmission schemes are tried in a predetermined order (in descending order of effective rate). When a transmission scheme whose turn comes relatively early in the order (transmission scheme with a relatively high effective rate) is chosen from among the plurality of transmission schemes, the choice will be completed in a short time, but when a transmission scheme whose turn comes relatively late in the order (transmission scheme with a relatively low effective rate) is chosen, there is the problem that the time taken to complete the choice increases.

It could therefore be helpful to provide a control method or the like for a communication device that chooses a transmission scheme capable of completing communications in a shorter time.

SUMMARY

We thus provide a control method for a communication device including a communication interface for communicating with a wireless terminal. The control method includes, in a first period, successively selecting one transmission scheme included in a plurality of transmission schemes according to schedule information and using the selected one transmission scheme to try communications with the wireless terminal via the communication interface, determining which transmission scheme of the plurality of transmission schemes has succeeded in communicating with the wireless terminal in the first period, and adjusting the schedule information so that a trial of communications using a transmission scheme determined as having succeeded in communicating with the wireless terminal is started earlier in a second period subsequent to the first period than in the first period.

Accordingly, the communication device adjusts the schedule so that the trials of communications using a transmission scheme assumed to have a relatively high probability of success in communications are conducted earlier in the future second period than in the first period. This allows the communication device to succeed in communications at an earlier moment in the second period than in the first period. In this way, the communication device can choose a transmission scheme capable of completing communications in a shorter time.

The schedule information includes an order of trials of communications for each of the plurality of transmission schemes, and in the adjusting, the schedule information may be adjusted by advancing a trial of communications using a transmission scheme determined as having succeeded in communications, in the order in the schedule information.

With this specific configuration in which the trials of communications using a transmission scheme assumed to have a relatively high probability of success in communications in the second period are advanced in the order in the schedule, the communication device can choose a transmission scheme capable of completing communications in a shorter time.

The schedule information includes the number of trials of communications to be conducted using each of the plurality of transmission schemes and, in the adjusting, the schedule information may be adjusted by relatively increasing the number of trials of communications to be conducted using a transmission scheme determined as having succeeded in communicating with the wireless terminal, in the schedule information.

With this specific configuration in which the number of trials of communications to be conducted using a transmission scheme assumed to have a relatively high probability of success in communications in the second period is relatively increased in the schedule, the communication device can choose a transmission scheme capable of completing communications in a shorter time.

In the adjusting, the schedule information may be further adjusted so that a trial of communications using a transmission scheme determined as having failed in communications with the wireless terminal is started later in the second period than in the first period.

With this communication device, the trials of communications using a transmission scheme assumed to have a relatively low probability of success in communications in the second period are delayed in the order in the schedule. As a result, a transmission scheme different from the transmission scheme delayed in the order is tried relatively early in the second period, and the trials of communications can succeed at the earliest possible moment. Accordingly, the communication device can choose a transmission scheme capable of completing communications in a shorter time.

The determining further includes acquiring success/failure information that indicates success or failure in trials of communications with one wireless terminal in a plurality of first periods, each of which is the first period, and determining, on the basis of the acquired success/failure information, whether one transmission scheme has succeeded in communicating with the one wireless terminal in a threshold number or more of first periods out of the plurality of first periods. In the adjusting, the schedule information may be adjusted only when it is determined in the determining that the one transmission scheme has succeeded in communicating with the one wireless terminal in the threshold number or more of first periods.

Accordingly, the communication device changes the schedule only when one transmission scheme has succeeded in communications in a threshold number or more of first periods out of a plurality of first periods. If the schedule is changed as a result of a relatively small number of successes in communications, the schedule may be changed with temporary or instantaneous changes in radio conditions, and this can result in an increase in the frequency of changes in the schedule and unstable operations of the communication device. The operations of the communication device can be stabilized by suppressing the occurrence of changes in the schedule resulting from a relatively small number of successes in communications.

Each of the first period and the second period may be a period determined in advance as a dedicated period for research on wireless communication environments.

Accordingly, the communication device can try communications without affecting communications regarding the control data for controlling equipment included in the control system, and can choose a transmission scheme capable of completing communications in a shorter time.

Each of the first and second periods may also be a period determined in advance as a dedicated period for communications between the communication device and the wireless terminal.

Accordingly, the communication device can conduct research on wireless communication environments concurrently with communications regarding the control data for controlling equipment included in the control system, and can choose an adequate transmission scheme. Thus, it is possible to choose a transmission scheme capable of completing communications in a shorter time.

The communication device stores an initial schedule that is the schedule information prior to adjustment in the adjusting, and the adjusting further includes, after the adjustment of the schedule information, executing the selecting, the determining, and the adjusting according to the adjusted schedule information, using each of a plurality of successive periods subsequent to the second period as the first period, and if the adjustment of the schedule information is not made in the adjusting after a lapse of a predetermined number of first periods, each of which is the first period, the initial schedule may be set as adjustment of the schedule information.

Accordingly, the communication device can gain an opportunity to try a transmission scheme having a relatively high transmission speed, and if this transmission scheme with a relatively high transmission speed has succeeded in communications, the communication device can use the initial schedule for subsequent trials of communications. In this way, there is the advantage that a transmission scheme with a relatively high transmission speed is allocated a relatively early time in the schedule.

A communication device may include a communication interface for communicating with a wireless terminal. The communication device includes a controller that, in a first period, successively selects one transmission scheme included in a plurality of transmission schemes according to schedule information and uses the selected one transmission scheme for a trial of communications with the wireless terminal via the communication interface, a determiner that determines which transmission scheme of the plurality of transmission schemes has succeeded in communicating with the wireless terminal in the first period, and an adjuster that adjusts the schedule information so that a trial of communications using a transmission scheme determined as having succeeded in communicating with the wireless terminal is started earlier in a second period subsequent to the first period than in the first period.

Accordingly, similar effects to those of the above-described control method for a communication device can be achieved.

The contents of this disclosure can be implemented not only in the form of a device, but also in the form of a method using processing means of the device as steps, in the form of a program that causes a computer to execute the steps, in the form of a computer-readable recording medium recording the program such as a CD-ROM, or in the form of information, data, or a signal indicating the program. The program, information, data, and signal may be distributed via a communication network such as the Internet.

The control method for a communication device thus enables choosing a transmission scheme capable of completing communications in a shorter time.

REFERENCE SIGNS LIST 1 control system
5 track
10 base station
11 communication IF
12 controller
12A schedule
13 determiner
14 adjuster
20A, 20B, 20C terminal
30 network
40 control unit A1, A2, A3, A37, B38, B39, B40 frame
K ACK frame
T1, T2, T3, T4, T5, T6 communication period

DETAILED DESCRIPTION

An example will be described in detail with reference to the drawings.

The example described below shows a preferable specific configuration of our devices and methods. Numerical values, shapes, materials, constituent elements, the positions of arrangement of constituent elements and the form of connection thereof, steps, the order of steps, and others given in the following configuration are merely examples, and do not intend to limit this disclosure. Among the constituent elements given in the following example, those that are not recited in any of the independent claims, which represent the broadest concepts of this disclosure, are described as optional constituent elements that constitute more preferable examples.

Identical constituent elements are given the same reference signs, and descriptions thereof may not be given.

This example describes a communication device that chooses a transmission scheme capable of completing communications in a shorter time, and a control method for the communication device. The above communication device is implemented in the form of a base station device in this example.

Figure 1:
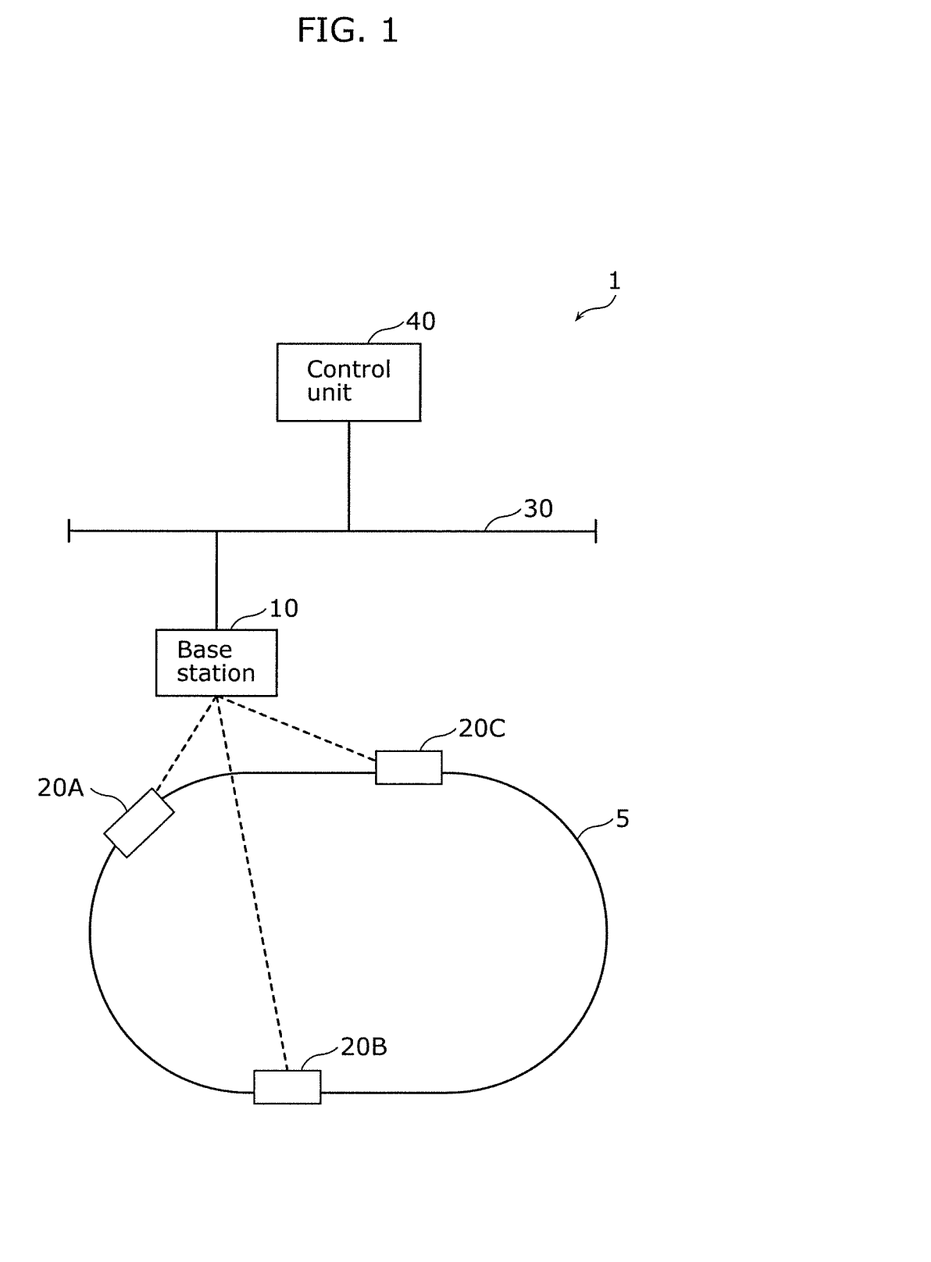
FIG. 1 is a schematic block diagram illustrating a configuration of a control system according to an example.

FIG. 1 is a schematic block diagram illustrating a configuration of control system 1 according to the example. FIG. 1 schematically illustrates a top view of a facility that installs control system 1, and also illustrates a network configuration diagram.

As illustrated in FIG. 1, control system 1 includes base station 10, terminals 20A, 20B, and 20C, network 30, and control unit 40. Terminals 20A, 20B, and 20C are also referred to as "terminals 20A and so on".

Control system 1 is a track control system that causes terminals 20A and so on, which are vehicles running under computer control of control unit 40, to run on track 5 that is a guideway provided in advance on a ceiling or floor in the facility. Terminal 20A is configured to move to an instructed location or transport articles under the control of control unit 40. Control system 1 is also applicable to a trackless control system in a similar manner.

Base station 10 is a base station device (generally also referred to as an "access point") serving as a communication device that establishes a wireless communication link with each of terminals 20A and so on and carries out wireless communications. For example, base station 10 carries out wireless communications via a communication interface such as a wireless LAN that is compatible with IEEE802.11a/b/g/n standards or other standards. Base station 10 has a wireless communication area that covers track 5. Base station 10 successively transmits and receives frames to and from each of terminals 20A and so on by radio waves. Base station 10 and control unit 40 are communicably connected via network 30. When a frame that includes control data regarding control of terminals 20A and so on is received from control unit 40, base station 10 transmits this frame to terminals 20A and so on targeted for control by wireless communications.

Terminals 20A, 20B, and 20C are vehicles that run under the control of control unit 40. Terminals 20A and so on run freely on track 5 under the control of control unit 40 to, for example, transport articles. Terminal 20A also receives a frame including control data from control unit 40 by carrying out wireless communications with base station 10, and when the frame has been received successfully, terminal 20A transmits an acknowledgement (ACK) frame. Terminals 20A and so on correspond to wireless terminals (generally also referred to as "stations") that carry out wireless communications with base station 10.

Terminals 20B and 20C are vehicles that have a similar function to that of terminal 20A. Each of terminals 20B and 20C receives from control unit 40 control data that is independent of the control data received by terminal 20A, and operates independently. The number of terminals 20A and so on is not limited to three, and may be any arbitrary number greater than or equal to one. Alternatively, the configuration may be such that terminals 20A and so on receive the same control data and each execute only an instruction given to itself in the control data.

Terminals 20A and so on are controlled to carry out wireless communications with base station 10 at different times. Control unit 40 divides time for each of terminals 20A and so on and successively transmits control data. The control data transmitted from control unit 40 for each of terminals 20A and so on is transmitted from base station 10 to each of terminals 20A and so on by wireless communications. The time divided as described above is also referred to as "communication periods". In this way, communication periods for communicating with each of terminals 20A and so on are provided.

This configuration is an example of when terminals 20A, 20B, and 20C are configured integrally with the vehicles but, for example, terminals 20A, 20B, and 20C may be communication devices separate from the vehicles.

Control unit 40 is a control unit that uses a computer to control the operations of terminals 20A and so on. Specifically, control unit 40 performs control such as moving terminals 20A and so on to predetermined locations or transporting articles to terminal 20A. Control unit 40 transmits control data including the above content of control via base station 10 to terminals 20A and so on targeted for control.

Network 30 is a local area network connected to base station 10 and control unit 40. Examples of network 30 include wired LANs compatible with IEEE802.3 standards or other standards, and wireless LANs compatible with IEEE802.11a/b/g/n standards or other standards.

Figure 2:
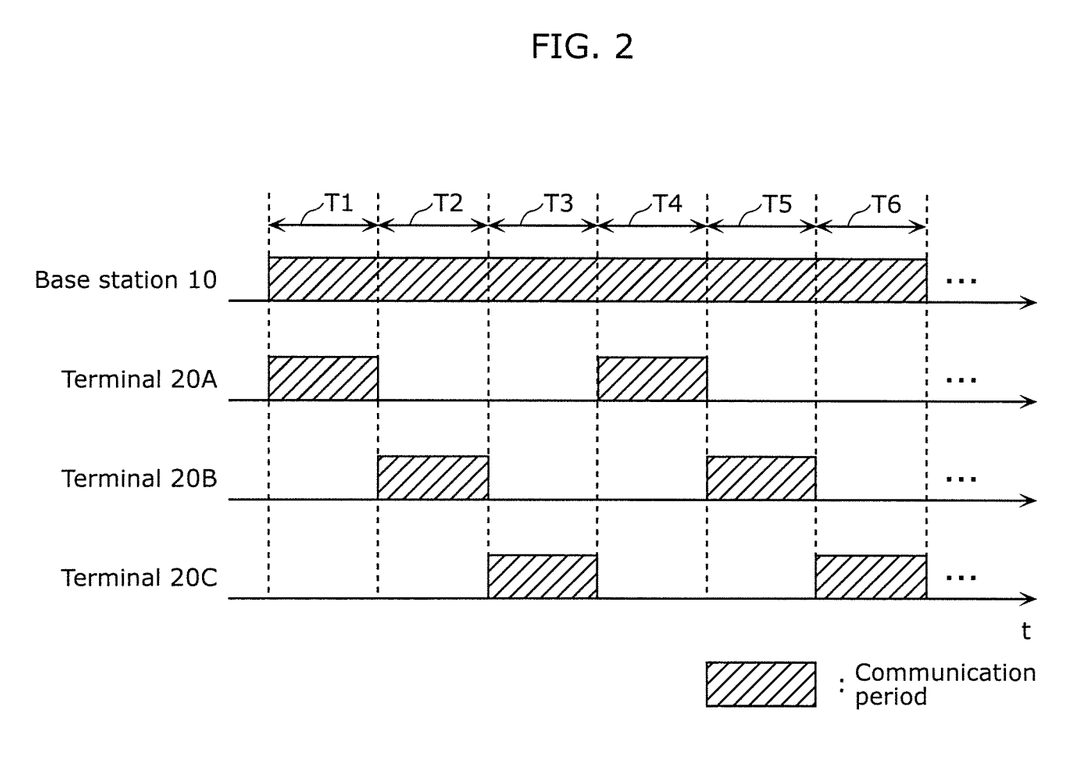
FIG. 2 is an explanatory diagram illustrating an example of timing of communications in the control system.

Next, the timing of communications in control system 1 will be described.

FIG. 2 is an explanatory diagram illustrating an example of the timing of communications in control system 1. The horizontal axis indicates time, and FIG. 2 illustrates communication periods during which wireless communications are carried out between base station 10 and terminals 20A and so on.

As illustrated in FIG. 2, communication periods are set such that base station 10 can successively communicate with each of terminals 20A, 20B, and 20C. When base station 10 has completed the communication periods for communicating with all the terminals, other communication periods are repeatedly set again to enable successive communications with each terminal. These communication periods are achieved by control unit 40 successively transmitting a frame including control data to each terminal. If a transmitted frame has not been received normally by each terminal, base station 10 re-transmits the frame while changing the transmission scheme. This retransmission is also conducted within the communication period.

For example, communication period T1 is a communication period for communications between base station 10 and terminal 20A. In communication period T1, base station 10 transmits a frame including control data given for terminal 20A from control unit 40, to terminal 20A. Upon successfully receiving the frame from base station 10, terminal 20A transmits an ACK frame. When the ACK frame is not received, base station 10 re-transmits the above frame within communication period T1, and upon receipt of an ACK frame, completes the communication of the frame.

Similarly, communication period T2 is a communication period for communications between base station 10 and terminal 20B, and communication period T3 is a communication period for communications between base station 10 and terminal 20C. Communication periods T4 to T6 are set after communication periods T1 to T3. Communication periods T4 to T6 are similar to communication periods T1 to T3. Similar communication periods are also repeatedly set after communication period T6.

The number of terminals 20A and so on is not limited to three, and if there are four or more terminals, communication periods are successively set with the above timing of communications according to the number of terminals.

Figure 3:
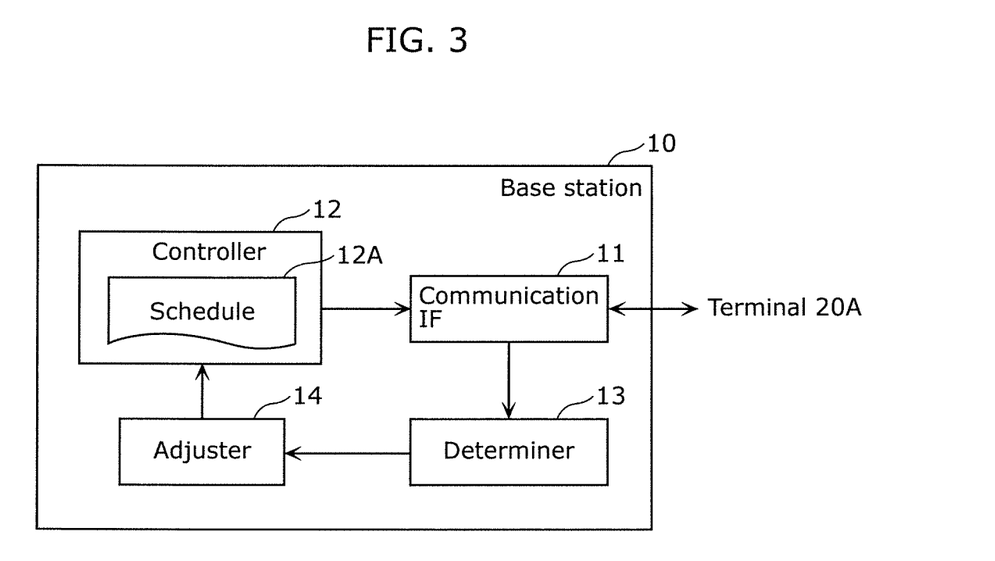
FIG. 3 is a block diagram illustrating a functional configuration of a base station according to an example.

FIG. 3 is a block diagram illustrating a functional configuration of base station 10 according to the example.

As illustrated in FIG. 3, base station 10 includes communication interface (IF) 11, controller 12, determiner 13, and adjuster 14.

Communication IF 11 is a wireless communication interface device that establishes communication links with terminals 20A and so on and communicates with terminals 20A and so on via the communication links. Communication IF 11 is configured to include, for example, an antenna, a transmit-receive circuit for radio waves, a modulator-demodulator, and a media-access-control (MAC) protocol processing unit. Examples of the communication standards for wireless communications include wireless LANs compatible with IEEE802.11a/b/g/n standards or other standards.

Controller 12 is a processing unit that controls communication IF 11 for trials of communications. Controller 12 includes schedule 12A that is predetermined information about the trials of communications via communication IF 11. In a first period, controller 12 successively selects one transmission scheme included in a plurality of transmission schemes according to schedule 12A and uses the selected one transmission scheme for trials of communications with terminal 20A via communication IF 11. Schedule 12A is also referred to as schedule information.

The term "communications" means the operation of base station 10 transmitting a frame, re-transmitting the frame when an ACK frame responsive to the frame is not received, and receiving an ACK frame. A "trial of communications" means the transmission and retransmission of a frame. The receipt of an ACK frame responsive to a frame after transmission or retransmission of the frame may be referred to as success in communications. On the other hand, the non-receipt of an ACK frame responsive to a frame after transmission or retransmission of the frame may be referred to as failure in communications.

The transmission scheme is defined by, for example, a transmission rate, an encoding scheme, and an encoding rate and corresponds to, for example, the modulation and coding scheme (MCS) in IEEE802.11n.

Schedule 12A is information that defines the type of transmission scheme and the number of trials of communications to be conducted using that transmission scheme during the trials of communications. Controller 12 can be implemented by a processor executing a program. The first period is one of the communication periods.

Determiner 13 is a processing unit that determines whether communications via communication IF 11 have succeeded or not. Specifically, determiner 13 determines which transmission scheme of the above plurality of transmission schemes has succeeded in communicating with terminal 20A in the first period. For example, determiner 13 acquires success/failure information that indicates success or failure in communications via communication IF 11 for a plurality of transmission schemes under the control of controller 12. On the basis of the acquired success/failure information, determiner 13 determines a transmission scheme that has succeeded in communicating with terminal 20A in the first period. Determiner 13 can be implemented by a processor executing a program.

Adjuster 14 is a processing unit that adjusts schedule 12A of controller 12. Specifically, adjuster 14 adjusts schedule 12A so that the trials of communications using a transmission scheme determined as having succeeded in communicating with terminal 20A by determiner 13 are started earlier in a second period subsequent to the first period than in the first period. Adjuster 14 can be implemented by a processor executing a program. The second period is one of the communication periods and is a communication period subsequent to the first period.

Adjuster 14 may adjust schedule 12A only when a predetermined condition concerning the success/failure information acquired by determiner 13 is satisfied. For example, the above predetermined condition for determining whether or not to adjust schedule 12A may be that, after a lapse of a plurality of first periods (a plurality of successive periods subsequent to the second period), one transmission scheme has succeeded in communicating with terminal 20A in a threshold number or more of first periods out of the plurality of first periods. More specifically, the above predetermined condition may be that one transmission scheme has succeeded in communicating with terminal 20A in 70 or more first periods out of the past 100 first periods. The threshold value may be set to, for example, approximately 50% of a plurality of first periods or approximately 70% to 90% of a plurality of first periods, but this disclosure is not limited thereto.

Figure 4:
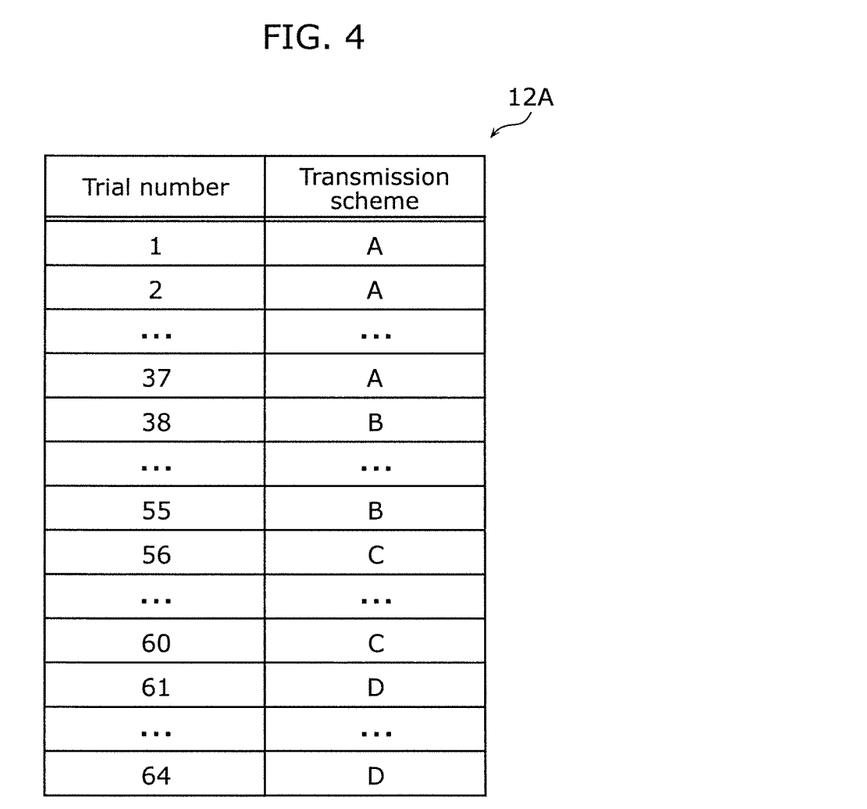
FIG. 4 is an explanatory diagram illustrating an example of a schedule of transmission schemes used for trials of communications during a communication period.
Figure 5:
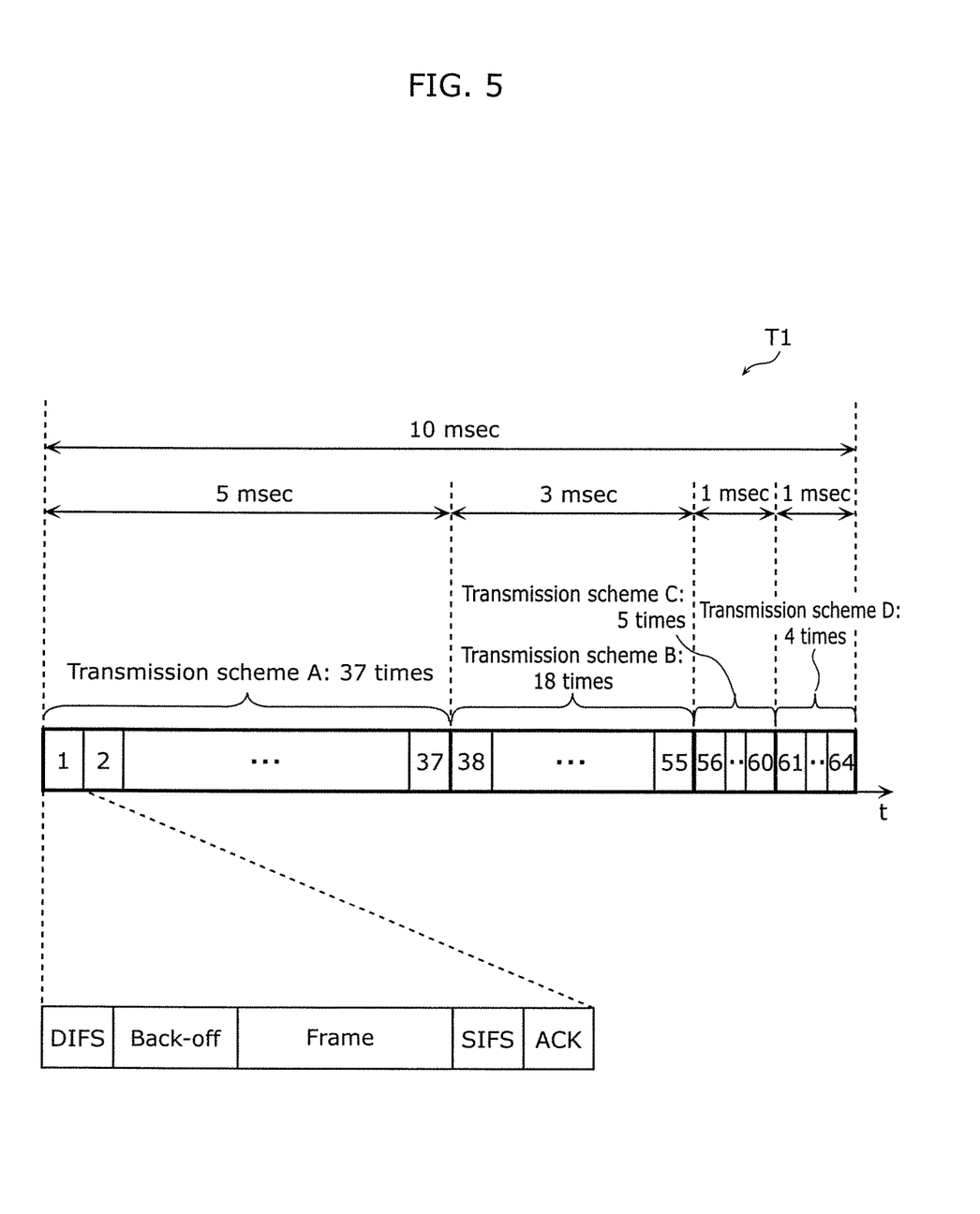
FIG. 5 is an explanatory diagram illustrating the timing of trials of communications according to the schedule in FIG. 4.

FIG. 4 is an explanatory diagram illustrating an example of schedule 12A of transmission schemes used for the trials of communications during communication period T1 according to this example. FIG. 5 is an explanatory diagram illustrating the timing of trials of communications according to schedule 12A illustrated in FIG. 4. Schedule 12A illustrated in FIG. 4 is used for communications during communication period T1, which is one example of the communication periods, but a similar description also applies to other communication periods. FIG. 5 illustrates specific numerical values assuming IEEE802.11n communication standards, but a similar description also applies to other communication standards if numerical values for the other communication standards are used.

An example is described in which, as illustrated in FIG. 5, communication period T1 has a time length of 10 milliseconds, and the trials of communications using four transmission schemes A, B, C, and D are conducted in this order during communication period T1. The ratio of times allocated to four transmission schemes A, B, C, and D is assumed to be 5:3:1:1. Four transmission schemes A, B, C, and D are described respectively as MCS12, MCS11, MCS4, and MCS3 in IEEE802.11n, but the transmission schemes are not limited thereto.

In this example, four transmission schemes A, B, C, and D are respectively allocated 5 milliseconds, 3 milliseconds, 1 milliseconds, and 1 milliseconds out of 10-millisecond communication period T1.

Meanwhile, a single communication includes the transmission of a frame from base station 10 to terminal 20A and the transmission of an ACK frame responsive to the transmitted frame from terminal 20A. When a single frame has a data length of 512 bytes, the time required for a single communication using transmission scheme A, for example, is approximately 135 μsec, which is a total of a DIFS time, a back-off time, a frame transmission time, an SIFS time, and an ACK-frame transmission time. Thus, the number of communications that can be conducted within 5 milliseconds by transmission scheme A is 37 times, as illustrated in FIG. 5. Similarly, the number of communications that can be conducted within 3 milliseconds by transmission scheme B is 18 times, the number of communications that can be conducted within one millisecond by transmission scheme C is 5 times, and the number of communications that can be conducted within one millisecond by transmission scheme D is 4 times.

The aforementioned time required for a single communication may be obtained by calculating a transmission standby time compliant with IEEE802.11 standards. The above example is, however, merely one example.

In this way, the number of trials to be conducted according to schedule 12A illustrated in FIG. 4 is determined. Specifically, schedule 12A is determined to use transmission scheme A for the first to 37th trials, use transmission scheme B for the 38th to 55th trials, use transmission scheme C for the 56th to 60th trials, and use transmission scheme D for the 61st to 64th trials.

In general, when a transmission scheme that can succeed in communications is unknown, the trials of communications are conducted while changing the transmission scheme in order from those with relatively high transmission speeds to those with relatively low transmission speeds. This is because, if communications succeed at a relatively high transmission speed, the time required to succeed in communications can be shortened. Schedule 12A illustrated in FIG. 4 shows one example of such a schedule of transmission schemes and is also referred to as an "initial schedule".

Next description is given of the success/failure information indicating success or failure in communications via communication IF 11 for a plurality of transmission schemes.

Figure 6:
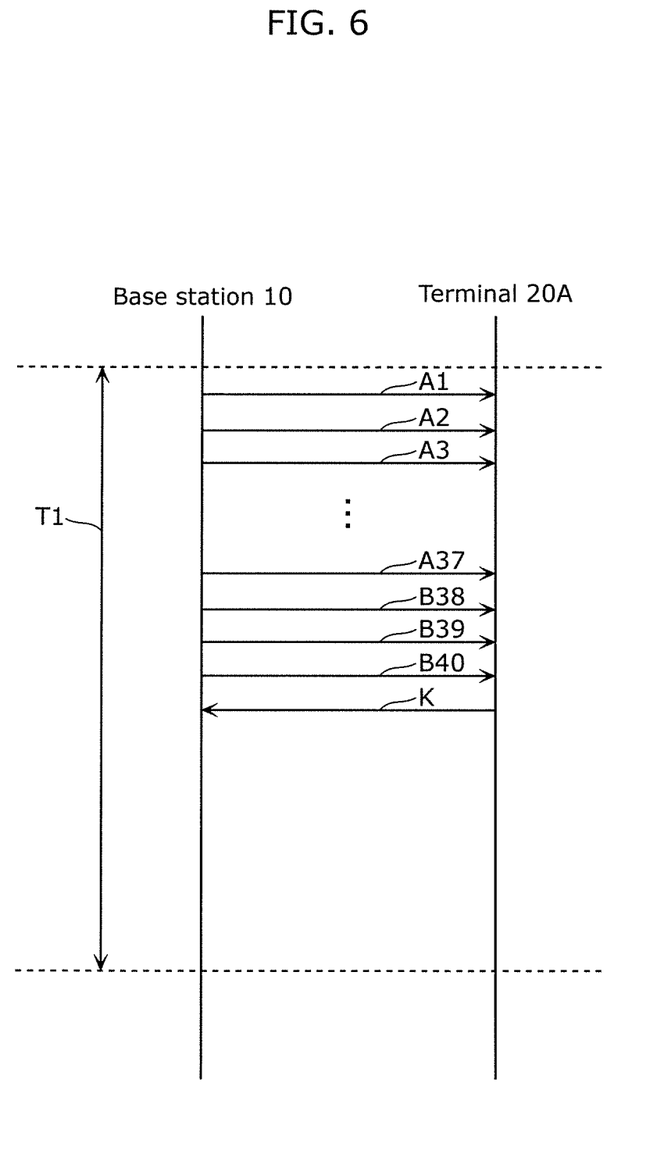
FIG. 6 is a sequence diagram illustrating an example of communications in the control system.
Figure 7:
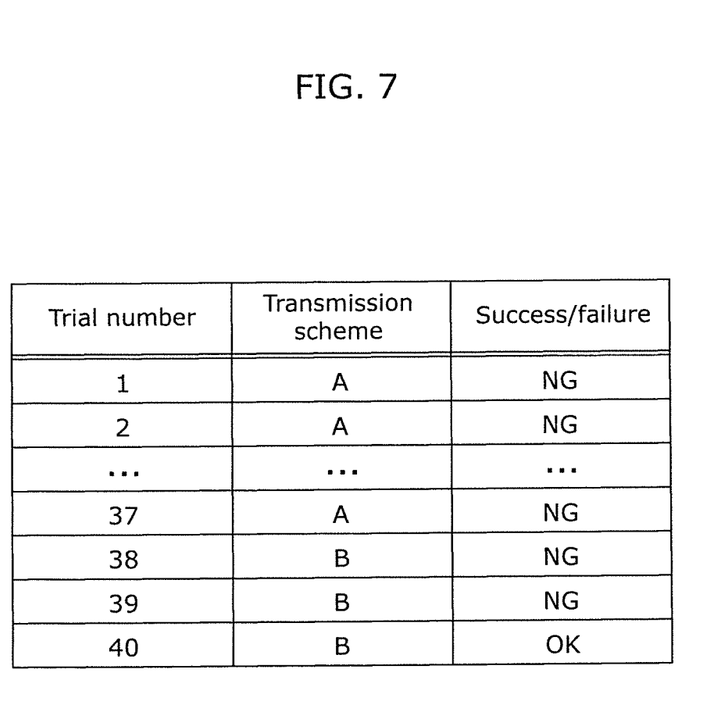
FIG. 7 is an explanatory diagram illustrating an example of success/failure information regarding the communications in FIG. 6.

FIG. 6 is a sequence diagram illustrating one example of communications conducted in control system 1. FIG. 7 is an explanatory diagram illustrating an example of the success/failure information regarding the communications illustrated in FIG. 6.

FIG. 6 illustrates how communications are carried out between base station 10 and terminal 20A in control system 1. For each trial of communications, base station 10 transmits a frame, using the transmission scheme according to schedule 12A illustrated in FIG. 4.

As illustrated in FIG. 6, each frame transmitted for the trial of communications between base station 10 and terminal 20A is indicated by a transmission scheme and a numeric value indicating trial number (e.g., frame A1).

First, base station 10 transmits frame A1 that is a frame regarding the first trial of communications. After base station 10 has transmitted frame A1, terminal 20A does not transmit an ACK frame responsive to frame A1. On the basis of the fact that no ACK frame has been received after a lapse of a transmission standby time since the transmission of frame A1, base station 10 determines that frame A1 did not arrive at terminal 20A.

Similarly, base station 10 transmits frames A2 to A37 regarding the 2nd to 37th communications. In this example, terminal 20A does not transmit ACK frames responsive to frames A2 to A37.

Next, base station 10 transmits frames B38 to B40 regarding the trials of communications using transmission scheme B, according to schedule 12A. Terminal 20A transmits ACK frame K after receipt of frame B40, and base station 10 receives ACK frame K.

Upon receipt of ACK frame K, base station 10 completes the transmission of frame B40 and does not re-transmit the frame thereafter.

As illustrated in FIG. 7, the success/failure information includes the transmission scheme used for each trial of communications, and information indicating success or failure in the trials of communications. In FIG. 7, success in the trials of communications is indicated by "OK," and failure in the trials of communications is indicated by "NG".

FIG. 7 shows that the 1st to 37th trials of communications have been conducted using transmission scheme A, and all have failed ("NG" in the success/failure information). FIG. 7 also shows that the 38th and 39th trials of communications using transmission scheme B have failed, and the 40th trial of communications using transmission scheme B has succeeded ("OK" in the success/failure information). In the example in FIG. 7, once a trial of communications using transmission scheme B succeeded, subsequent trials of communications are canceled. However, as another example, subsequent trials of communications may be canceled when the same transmission scheme has succeeded either continuously or intermittently in a plurality of trials of communications.

Next, an example of the adjustment of schedule 12A in adjuster 14 will be described. The example shows when schedule 12A illustrated in FIG. 4 is adjusted by adjuster 14 upon acquisition of the success/failure information illustrated in FIG. 7.

Specifically, adjuster 14 adjusts schedule 12A so that the trials of communications using a transmission scheme determined as having succeeded in communicating with terminal 20A by determiner 13 are started earlier in the second period subsequent to the first period than in the first period. Two examples of this adjustment method will be described below.
(1) Example of Advancing a Transmission Scheme Having Succeeded in Trial in the Order FIG. 8 is an explanatory diagram illustrating a first example of the timing of trials of communications based on adjusted schedule 12A.

Adjuster 14 adjusts schedule 12A so that the transmission scheme having succeeded in the trial of communications is advanced in the order.

Figure 8:
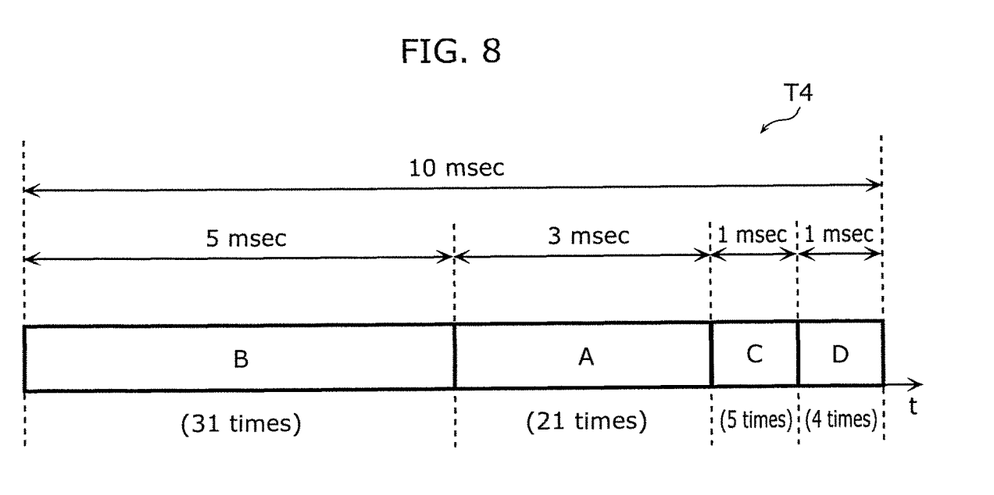
FIG. 8 is an explanatory diagram illustrating a first example of the timing of trials of communications based on the adjusted schedule.

As illustrated in FIG. 8, the order of the four transmission schemes according to adjusted schedule 12A is changed from A, B, C, and D, which is the order prior to the adjustment of schedule 12A, to B, A, C, and D. According to adjusted schedule 12A, four transmission schemes B, A, C, and D are respectively allocated 5 milliseconds, 3 milliseconds, 1 milliseconds, and 1 milliseconds so that the ratio of times allocated to four transmission schemes B, A, C, and D out of the 10-millisecond communication period becomes 5:3:1:1. At this time, the numbers of trials to be conducted using four transmission schemes B, A, C, and D are respectively 31 times, 21 times, 5 times, and 4 times according to calculation similar to that described above.

By so doing, the trials of communications using transmission scheme B, which is the transmission scheme having succeeded in communications in the first period, can be conducted earlier in the second period than in the first period. Since transmission scheme B has succeeded in communications in the first period, transmission scheme B also has a high probability of success in communications in the second period. Therefore, the probability of success in communications can be increased by changing schedule 12A as described above. As a result, communications can be completed in a shorter time than when schedule 12A is not changed.

Figure 9:
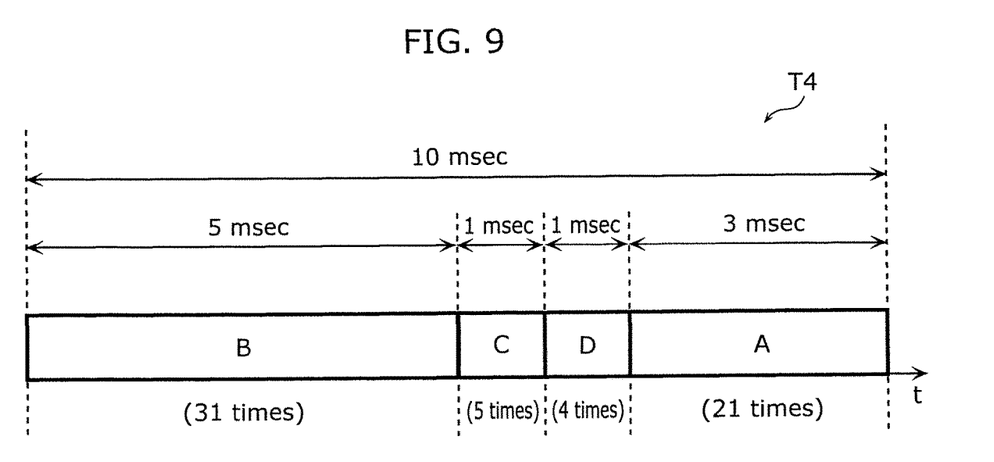
FIG. 9 is an explanatory diagram illustrating a second example of the timing of trials of communications based on the adjusted schedule.

At this time, schedule 12A may also be adjusted so that the trials of communications using transmission scheme A, which is the transmission scheme having failed in all the trials of communications, are conducted later in the second period. FIG. 9 illustrates the timing of trials of communications based on schedule 12A adjusted in this way.

FIG. 9 is an explanatory diagram illustrating a second example of the timing of trials of communications based on adjusted schedule 12A.

Adjuster 14 adjusts schedule 12A so that the trials of communications using a transmission scheme determined as having failed in the trials of communications are started later in the second period than in the first period.

Times allocated to each transmission scheme during the communication periods illustrated in FIG. 9 are changed from the allocated times illustrated in FIG. 8, and are adjusted so that the trials of communications using transmission scheme A are allocated a later time. As a result, the schedule is adjusted so that the trials of communications using transmission schemes C and D, except transmission schemes A and B, are allocated earlier times.

By so doing, the trials of communications using a transmission scheme with a high probability of success in the trials of communications can be conducted as early as possible, and the trials of communications using a transmission scheme with a high probability of failure in the trials of communications can be conducted as late as possible. Accordingly, the trials of communications can succeed at the earliest possible moment.

Figure 10:
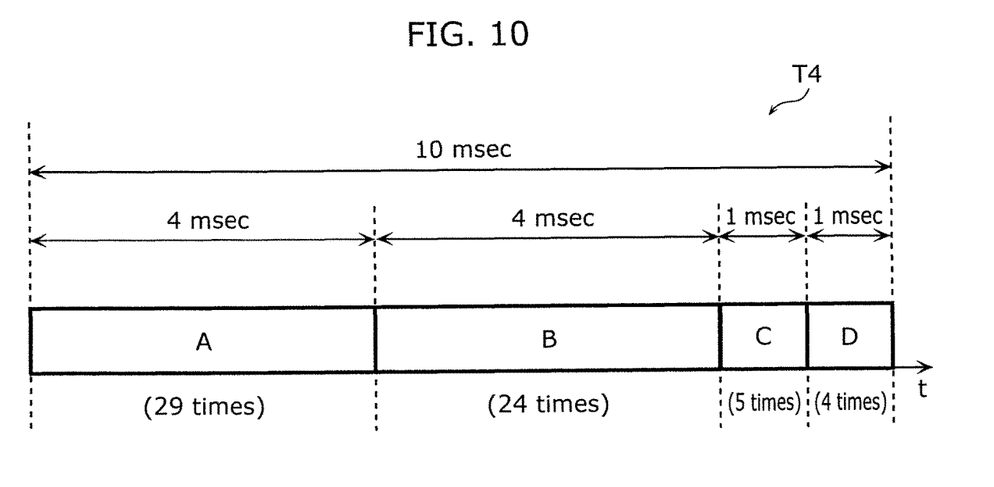
FIG. 10 is an explanatory diagram illustrating a third example of the timing of trials of communications based on the adjusted schedule.

(2) Example of Relatively Increasing the Number of Trials to be Conducted Using a Transmission Scheme Having Succeeded in Trial FIG. 10 is an explanatory diagram illustrating a third example of the timing of trials of communications based adjusted schedule 12A.

Adjuster 14 adjusts schedule 12A by relatively increasing the number of trials of communications to be conducted using a transmission scheme determined as having succeeded in communicating with terminal 20A.

As illustrated in FIG. 10, according to adjusted schedule 12A, the ratio of times allocated to four transmission schemes A, B, C, and D within the 10-millisecond communication period becomes 4:4:1:1. More specifically, the ratio of the time allocated to the trials of communications using transmission scheme A is reduced from 5 to 4, and the ratio of the time allocated to the trials of communications using transmission scheme B is increased from 3 to 4. In this way, the number of trials of communications to be conducted using transmission scheme B is relatively increased. Accordingly, communications using four transmission schemes A, B, C, and D are respectively allocated 4 milliseconds, 4 milliseconds, 1 milliseconds, and 1 milliseconds. At this time, the numbers of trials to be conducted using the respective transmission schemes are 29 times, 24 times, 5 times, and 4 times according to calculation similar to that described above.

By so doing, the trials of communications using transmission scheme B, which is the transmission scheme having succeeded in the trials of communications in the first period, can be started earlier in the second period than in the first period, and can be conducted a greater number of times. As a result, as in the above-described example (1), communications can be completed in a shorter time than when schedule 12A is not changed.

The processing of base station 10 configured as described above will be described below.

Figure 11:
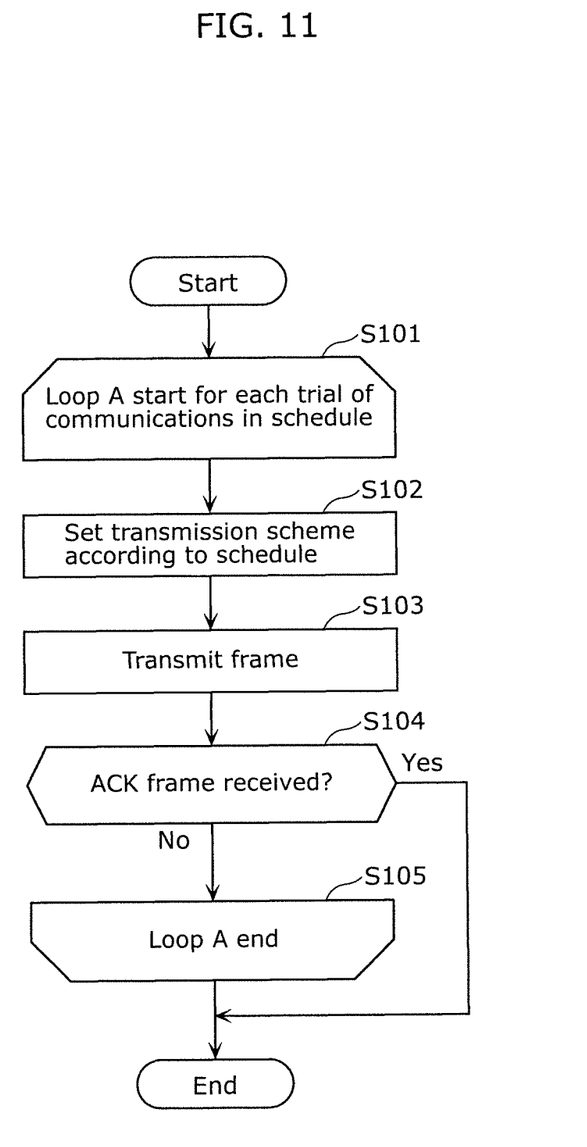
FIG. 11 is a flowchart of processing to transmit a frame from the base station.

FIG. 11 is a flowchart of processing for transmitting a frame from base station 10 according to the example.

In step S101, base station 10 starts repeat processing of loop A. Loop A is to perform processing from step S102 to step S104 for each trial of communications conducted according to schedule 12A.

In step S102, controller 12 sets, in communication IF 11, a transmission scheme to be used for the trials of communications according to schedule 12A. For example, in using schedule 12A illustrated in FIG. 4, transmission scheme A is set in communication IF 11 for the 1st to 37th trials of communications. Similarly, transmission scheme B is set for the 38th to 55th trials of communications, transmission scheme C is set for the 56th to 60th trials of communications, and transmission scheme D is set for the 61st to 64th trials of communications.

In step S103, controller 12 causes communication IF 11 to transmit a frame by using the transmission scheme set in step S102.

In step S104, controller 12 enters a standby state until an ACK frame responsive to the frame transmitted in step S103 is received via communication IF 11. If an ACK frame has been received in the standby state (Yes in step S104), it is determined that the communications regarding the frame have succeeded, and base station 10 exits from loop A and completes the series of processing illustrated in FIG. 11. If not (No in step S104), it is determined that the transmission of the frame has failed, and base station 10 proceeds to step S105.

If all the repeat processing of loop A has ended in step S105, base station 10 exits from loop A and completes the series of processing illustrated in FIG. 11. If the above processing has not yet ended, base station 10 proceeds to step S102 and conducts the next trial of communications.

Figure 12:
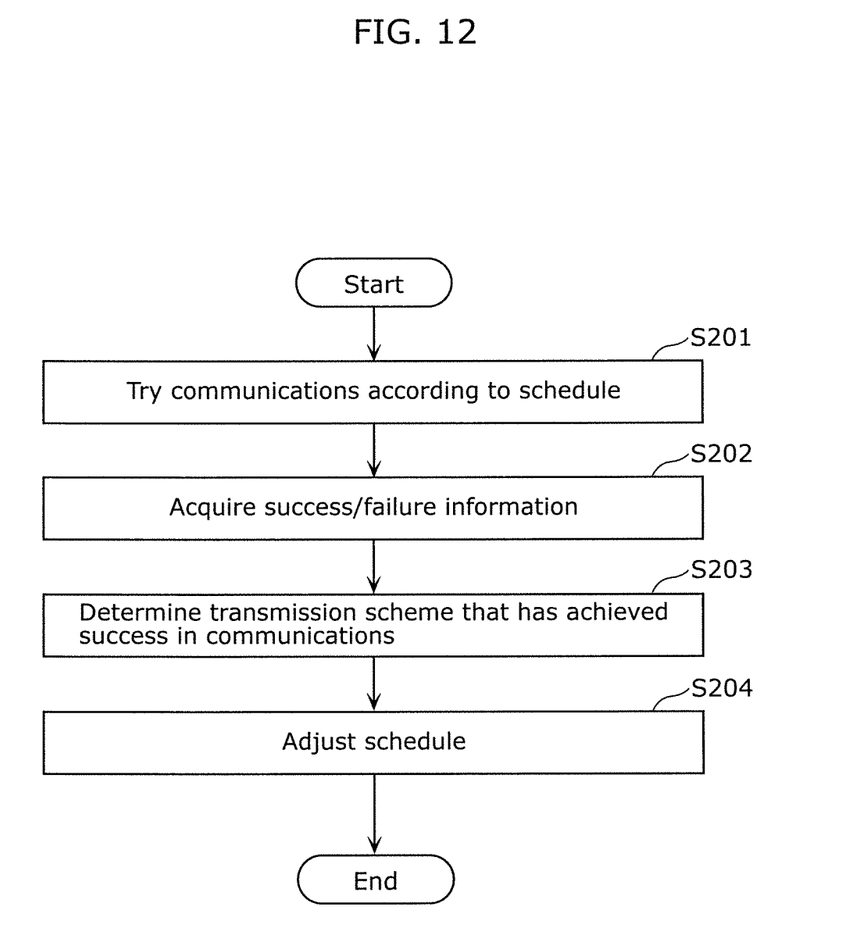
FIG. 12 is a flowchart of processing to adjust a schedule in the base station.

FIG. 12 is a flowchart of processing to adjust schedule 12A in base station 10 according to the example.

In step S201, controller 12 successively selects one transmission scheme included in a plurality of transmission schemes according to schedule 12A and uses the selected one transmission scheme to try communications with terminals 20A and so on via communication IF 11 in the first period. Under the control of controller 12, communication IF 11 tries communications with terminals 20A and so on.

In step S202, determiner 13 acquires success/failure information that indicates success or failure in communications via communication IF 11 for the plurality of transmission schemes in step S201.

In step S203, determiner 13 determines, on the basis of the success/failure information acquired in step S202, which transmission scheme of the plurality of transmission schemes has succeeded in communicating with terminal 20A in the first period.

In step S204, adjuster 14 acquires the success/failure information acquired by determiner 13 in step S202 and adjusts schedule 12A so that the trials of communications using the transmission scheme determined as having succeeded in communications are started earlier in the second period. When step S203 is completed, the series of processing illustrated in FIG. 12 ends.

Steps S203 and S204 may be performed only when a predetermined condition concerning the success/failure information is satisfied. Examples of the predetermined condition concerning the success/failure information are as described above.

When the series of processing illustrated in FIG. 12 is repeatedly performed, i.e., schedule 12A is continuously adjusted, a transmission scheme with a higher probability of success in communications is allocated an earlier time in schedule 12A. That is, if there are a relatively large number of factors such as noise, that prevent communications, a transmission scheme with a relatively low transmission speed is allocated an early time in schedule 12A, and a transmission scheme with a relatively high transmission speed is allocated a later time in schedule 12A. If the above factors are removed thereafter, it is desirable that a transmission scheme with a relatively high transmission speed is allocated a relatively early time in schedule 12A, but such adjustment cannot be made by simply performing the above-described processing for adjusting schedule 12A.

In view of this, if schedule 12A has not been adjusted since adjustment of schedule 12A even after a lapse of a predetermined number of communication periods, an initial schedule (see FIG. 4) may be set again to schedule 12A as adjustment of schedule 12A. This provides an opportunity to try a transmission scheme with a relatively high transmission speed, and if the transmission scheme with a relatively high transmission speed has succeeded in communications, the initial schedule may be used for subsequent trials of communications. In this way, there is the advantage that a transmission scheme with a relatively high transmission speed is allocated a relatively early time in schedule 12A. The number of communication periods included in the time length over which, for example, the appearance or disappearance of factors that prevent communications may occur, may be employed as the predetermined number. For example, the predetermined number may be approximately 100 or approximately 1000.

A communication period such as the first period or the second period in the above description may be a period determined in advance as a dedicated period for research on wireless communication environments. In this example, base station 10 can conduct trials of communications without affecting communications regarding control data for controlling terminals 20A and so on, and can choose a transmission scheme capable of completing communications in a shorter time.

On the other hand, a communication period such as the first period or the second period in the above description may be a period determined in advance as a dedicated period for communications between the communication device and a wireless terminal. In this example, base station 10 can conduct research on wireless communication environments concurrently with communications regarding control data for controlling terminals 20A and so on, and can choose an adequate transmission scheme. Accordingly, it is possible to choose a transmission scheme capable of completing communications in a shorter time.

The description has given an example in which terminals 20A and so on, which are vehicles running under the control of control unit 40, serve as vehicles that achieve functions such as transporting articles, but some of terminals 20A and so on may serve as dedicated vehicles that choose a transmission scheme capable of completing communications in a shorter time. By so doing, it is possible to clarify the functions or roles of the vehicles and prevent different processing, e.g., processing for choosing a transmission scheme and processing for transporting articles, from exerting influences on each other.

As described above, in the control method for a communication device, the communication device adjusts the schedule so that the trials of communications using a transmission scheme assumed to have a relatively high probability of success in communications are conducted earlier in the future second period than in the first period. This allows the communication device to succeed in communications at an earlier moment in the second period than in the first period. In this way, the communication device can choose a transmission scheme capable of completing communications in a shorter time.

With the specific configuration in which the trials of communications using a transmission scheme assumed to have a relatively high probability of success in communications in the second period are advanced in the order in the schedule, the communication device can choose a transmission scheme capable of completing communications in a shorter time.

With the specific configuration in which the number of trials of communications using a transmission scheme assumed to have a relatively high probability of success in communications in the second period is relatively increased in the schedule, the communication device can choose a transmission scheme capable of completing communications in a shorter time.

With the communication device, the trials of communications using a transmission scheme assumed to have a relatively low probability of success in communications in the second period are delayed in the order in the schedule. As a result, a transmission scheme different from the transmission scheme delayed in the order is tried relatively early in the second period, and the trials of communications can succeed at the earliest possible moment. Accordingly, the communication device can choose a transmission scheme capable of completing communications in a short time.

The communication device changes the schedule only when one transmission scheme has succeeded in communications in a threshold number or more of first periods out of a plurality of first periods. If the schedule is changed as a result of a relatively small number of successes in communications, the schedule may be changed with temporary or instantaneous changes in radio conditions, and this can result in an increase in the frequency of changes in schedule and unstable operations of the communication device. The operations of the communication device can be stabilized by suppressing the occurrence of changes in the schedule resulting from a relatively smaller number of successes in communications.

The communication device can try communications without affecting communications regarding the control data for controlling equipment included in the control system, and can choose a transmission scheme capable of completing communications in a shorter time.

The communication device can conduct research on wireless communication environments concurrently with the communications regarding the control data for controlling equipment included in the control system, and can choose an adequate transmission scheme. Accordingly, it is possible to choose a transmission scheme capable of completing communications in a shorter time.

The communication device can gain an opportunity to try a transmission scheme with a relatively high transmission speed, and if the transmission scheme with a relatively high transmission speed has succeeded in communications, the communication device can use the initial schedule for subsequent trials of communications. In this way, there is the advantage that a transmission scheme with a relatively high transmission speed is allocated a relatively early time in the schedule.

The communication device or the like has been described thus far with reference to an example thereof, but this disclosure is not limited to this example. This disclosure also includes other variations obtained by applying various changes conceivable by those skilled in the art to each example and obtained by any combinations of constituent elements and functions described in each example without departing from the scope of the appended claims.

INDUSTRIAL APPLICABILITY

This disclosure is applicable to a communication device that chooses a transmission scheme capable of completing communications in a shorter time. More specifically, this disclosure is applicable to devices such as base station devices in control systems that control industrial equipment.

The invention claimed is:

1. A method of controlling a communication device including a communication interface that communicates with a wireless terminal, the method comprising:
in a first period, successively selecting one transmission scheme included in a plurality of transmission schemes according to schedule information and using the selected one transmission scheme to try communications with the wireless terminal via the communication interface;
determining which transmission scheme of the plurality of transmission schemes has succeeded in communicating with the wireless terminal in the first period; and
adjusting the schedule information so that a trial of communications using a transmission scheme determined as having succeeded in communicating with the wireless terminal is started earlier in a second period subsequent to the first period than in the first period.

2. The method according to claim 1, wherein the schedule information includes an order of trials of communications for each of the plurality of transmission schemes, and
in the adjusting, the schedule information is adjusted by advancing a trial of communications using a transmission scheme determined as having succeeded in communications, in the order in the schedule information.

3. The method according to claim 1, wherein the schedule information includes the number of trials of communications to be conducted using each of the plurality of transmission schemes, and
in the adjusting, the schedule information is adjusted by relatively increasing the number of trials of communications to be conducted using a transmission scheme determined as having succeeded in communicating with the wireless terminal, in the schedule information.

4. The method according to claim 1, wherein, in the adjusting, the schedule information is further adjusted so that a trial of communications using a transmission scheme determined as having failed in communications with the wireless terminal is started later in the second period than in the first period.

5. The method according to claim 1, wherein the determining further includes:
acquiring success/failure information that indicates success or failure in trials of communications with one wireless terminal in a plurality of first periods, each of which is the first period; and
determining, on the basis of the acquired success/failure information, whether one transmission scheme has succeeded in communicating with the one wireless terminal in a threshold number or more of first periods out of the plurality of first periods, and
in the adjusting, the schedule information is adjusted only when it is determined in the determining that the one transmission scheme has succeeded in communicating with the one wireless terminal in the threshold number or more of first periods.

6. The method according to claim 1, wherein each of the first period and the second period is a period determined in advance as a dedicated period for research on wireless communication environments.

7. The method according to claim 1, wherein each of the first period and the second period is a period determined in advance as a dedicated period for communications between the communication device and the wireless terminal.

8. The method according to claim 1, wherein the communication device stores an initial schedule that is the schedule information prior to adjustment in the adjusting, and
the adjusting further includes:
after the adjustment of the schedule information, executing the selecting, the determining, and the adjusting according to the adjusted schedule information, using each of a plurality of successive periods subsequent to the second period as the first period; and
if the adjustment of the schedule information is not made in the adjusting after a lapse of a predetermined number of first periods, each of which is the first period, the initial schedule is set as adjustment of the schedule information.

9. A communication device including a communication interface that communicates with a wireless terminal, the communication device comprising:
a controller that, in a first period, successively selects one transmission scheme included in a plurality of transmission schemes according to schedule information and uses the selected one transmission scheme for a trial of communications with the wireless terminal via the communication interface;
a determiner that determines which transmission scheme of the plurality of transmission schemes has succeeded in communicating with the wireless terminal in the first period; and
an adjuster that adjusts the schedule information so that a trial of communications using a transmission scheme determined as having succeeded in communicating with the wireless terminal is started earlier in a second period subsequent to the first period than in the first period.

* * * * *